United States Patent
Sato et al.

(10) Patent No.: US 10,746,427 B2
(45) Date of Patent: Aug. 18, 2020

(54) AIR CONDITIONER BLOWING TEMPERATURE ESTIMATION APPARATUS AND COMPUTER-READABLE RECORDING MEDIUM

(71) Applicant: MITSUBISHI ELECTRIC CORPORATION, Tokyo (JP)

(72) Inventors: Fuyuki Sato, Tokyo (JP); Tomooki Ukiana, Tokyo (JP); Kazuhiro Komatsu, Tokyo (JP); Sosuke Minamida, Tokyo (JP); Satoko Tomita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 35 days.

(21) Appl. No.: 16/077,387

(22) PCT Filed: Sep. 9, 2016

(86) PCT No.: PCT/JP2016/076595
§ 371 (c)(1),
(2) Date: Aug. 10, 2018

(87) PCT Pub. No.: WO2017/175406
PCT Pub. Date: Oct. 12, 2017

(65) Prior Publication Data
US 2019/0049135 A1 Feb. 14, 2019

(30) Foreign Application Priority Data
Apr. 8, 2016 (JP) .................................. 2016-077754

(51) Int. Cl.
*F24F 11/42* (2018.01)
*F24F 11/65* (2018.01)
(Continued)

(52) U.S. Cl.
CPC .............. *F24F 11/42* (2018.01); *F24F 11/30* (2018.01); *F24F 11/38* (2018.01); *F24F 11/65* (2018.01);
(Continued)

(58) Field of Classification Search
CPC .. F24F 11/42; F24F 11/81; F24F 11/38; F24F 11/65; F24F 11/30; F24F 2110/10; F24F 2140/20; F24F 2221/34; G05B 17/02
See application file for complete search history.

(56) References Cited

U.S. PATENT DOCUMENTS 5,557,555 A * 9/1996 Friot ................... B60H 1/00971
703/3
2004/0261431 A1* 12/2004 Singh .................... F25B 49/005
62/125
(Continued)

FOREIGN PATENT DOCUMENTS

JP          6-34182 A     2/1994
JP          H0634182    * 8/1994 .............. F24F 11/02
(Continued)

OTHER PUBLICATIONS

Wu, Chen, Zhou Xingxi, and Deng Shiming. "Development of control method and dynamic model for multi-evaporator air conditioners (MEAC)." Energy conversion and management 46.3 (2005): 451-465. (Year: 2005).*
International Search Report for PCT/JP2016/076595 (PCT/ISA/210) dated Dec. 6, 2016.
(Continued)

*Primary Examiner* — Michael D Masinick
(74) *Attorney, Agent, or Firm* — Birch, Stewart, Jolasch & Birch, LLP

(57) ABSTRACT

Including a data acquisition unit (11) that periodically acquires various measured temperatures of a liquid pipe (4), a gas pipe (5), and an intake port from an air conditioner controller (20), an operating state determination unit (12)
(Continued)

that determines an operating state of an indoor unit (2) on the basis of the acquired various measured temperatures, a blowing temperature estimation unit (13) that estimates a blowing temperature from the indoor unit on the basis of the acquired various measured temperatures and an estimation model set in accordance with the determined operating state, and a blowing temperature display unit (14) that displays an estimated value of the blowing temperature.

6 Claims, 6 Drawing Sheets

(51) Int. Cl.
| | | |
|---|---|---|
| *F24F 11/38* | (2018.01) | |
| *F24F 11/30* | (2018.01) | |
| *F24F 11/81* | (2018.01) | |
| *G05B 17/02* | (2006.01) | |
| *F24F 110/10* | (2018.01) | |
| *F24F 140/20* | (2018.01) | |

(52) U.S. Cl.
CPC .............. *F24F 11/81* (2018.01); *G05B 17/02* (2013.01); *F24F 2110/10* (2018.01); *F24F 2140/20* (2018.01); *F24F 2221/34* (2013.01)

(56) References Cited

U.S. PATENT DOCUMENTS

| | | | |
|---|---|---|---|
| 2015/0000317 A1* | 1/2015 | Murakami | F25B 1/005 |
| | | | 62/190 |
| 2016/0109147 A1* | 4/2016 | Uno | F24F 11/70 |
| | | | 700/276 |
| 2019/0049135 A1* | 2/2019 | Sato | F24F 11/81 |
| 2019/0137131 A1* | 5/2019 | Sako | F24F 11/62 |

FOREIGN PATENT DOCUMENTS

| | | | | |
|---|---|---|---|---|
| JP | 6-247297 | A | 9/1994 | |
| JP | 8-178400 | A | 7/1996 | |
| JP | 2003-161495 | A | 6/2003 | |
| JP | 2006-183987 | A | 7/2006 | |
| JP | 2008-116061 | A | 5/2008 | |
| JP | 2008-138953 | A | 6/2008 | |
| JP | 2008-232588 | A | 10/2008 | |
| JP | 2009-97755 | A | 5/2009 | |
| JP | 2011-43300 | A | 3/2011 | |
| JP | 2012-17930 | A | 1/2012 | |
| JP | P2012017930 | * | 1/2012 | .............. F24F 11/02 |
| JP | 2012-225590 | A | 11/2012 | |

OTHER PUBLICATIONS

Office Action issued in corresponding Japanese Application No. 2016-077754 dated Oct. 29, 2019.

* cited by examiner

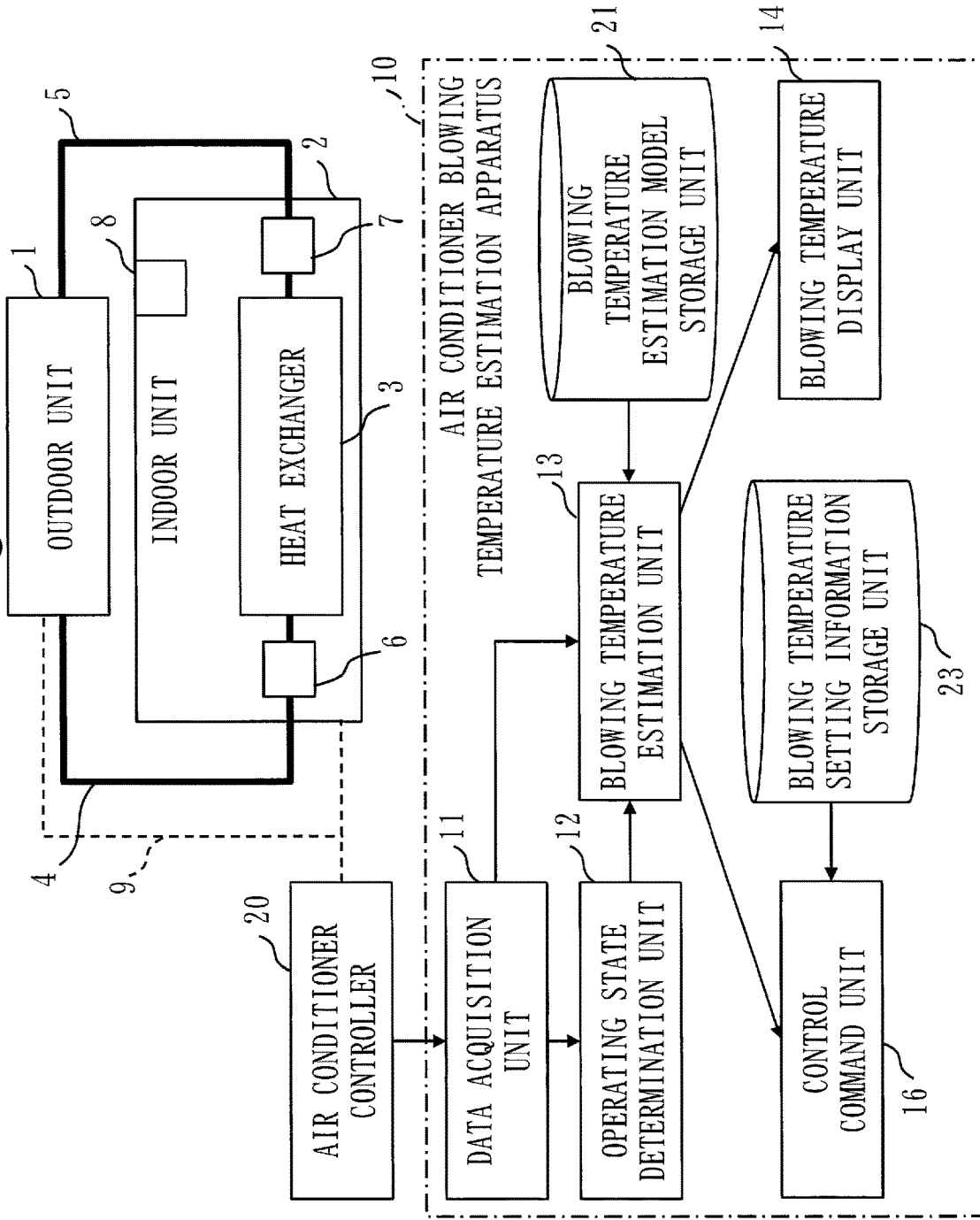

AIR CONDITIONER BLOWING TEMPERATURE ESTIMATION APPARATUS AND COMPUTER-READABLE RECORDING MEDIUM

TECHNICAL FIELD

The present invention relates to an air conditioner blowing temperature estimation apparatus and program, and particularly relates to estimation of a blowing temperature from an air conditioner that uses a refrigerant.

BACKGROUND ART

In heating operation of air conditioners that use refrigerant, defrosting of an outdoor unit must be performed during operation and, at that time, cold air is blown from an indoor unit. To solve this, measures have been implemented in which a blowing temperature is monitored and, when the blowing of cold air is detected, a total air volume is reduced. In the background art, technology has been proposed to estimate a blowing temperature from a pipe temperature of a heat exchanger without using a temperature sensor to measure the blowing temperature (e.g. Patent Literature 1).

CITATION LIST

Patent Literature

Patent Literature 1: JP-A-2009-97755
Patent Literature 2: JP-A-2011-43300
Patent Literature 3: JP-A-2008-116061
Patent Literature 4: JP-A-2003-161495
Patent Literature 5: JP-A-8-178400
Patent Literature 6: JP-A-2012-225590
Patent Literature 7: JP-A-2008-138953
Patent Literature 8: JP-A-2008-232588

SUMMARY OF INVENTION

Technical Problem

The outdoor unit of an air conditioner supplies the refrigerant to the indoor unit through refrigerant piping that extends from the outdoor unit to the indoor unit and, for example, in the case of cooling operation, it is known that when the blowing temperature is warmer than a temperature of the refrigerant piping (gas pipe, liquid pipe), the blowing temperature is strongly influenced by the refrigerant piping temperature. Additionally, when the refrigerant piping is not completely sufficiently cooled, the blowing temperature is influenced by an intake temperature.

However, in the background art, the blowing temperature from the indoor unit has not been estimated by considering a difference in a state of the temperature of the refrigerant piping in such air conditioners.

An object of the present invention is to estimate the blowing temperature from the indoor unit by considering the state of the air conditioner.

Solution to Problem

An air conditioner blowing temperature estimation apparatus according to the present invention includes:
refrigerant piping temperature acquisition means to acquire a measured temperature of refrigerant piping connected to a heat exchanger of an indoor unit;
intake temperature acquisition means to acquire a measured temperature of an intake port of the indoor unit;
determination means to determine an operating state of the indoor unit on the basis of the measured temperature acquired by the refrigerant piping temperature acquisition means and the measured temperature acquired by the intake temperature acquisition means; and
estimation means to estimate a blowing temperature from the indoor unit on the basis of the measured temperature acquired by the refrigerant piping temperature acquisition means, the measured temperature acquired by the intake temperature acquisition means and, among estimation models of the blowing temperature of the indoor unit, an estimation model set in accordance with the operating state determined by the determination means.

The estimation means adjusts an estimated value of the blowing temperature so that the estimated value continuously changes when switching the estimation model as a result of transitioning from a present operating state of the indoor unit to a different operating state. In the adjustment, the estimation means adjusts an output of the estimated value considering the degree of influence of the plurality of estimation models.

The air conditioner blowing temperature estimation apparatus includes:
detection means to detect an abnormality of the blowing temperature from the indoor unit by analyzing a chronological change in an estimation temperature by the estimation means; and
notification means to notify that an abnormality has been detected by the detection means.

The air conditioner blowing temperature estimation apparatus further includes command means to command operation control means of the indoor unit so that, when an estimation temperature by the estimation means deviates from a target value of the blowing temperature, the estimation temperature by the estimation means approaches the target value.

A program according to the present invention is for causing a computer to function as:
refrigerant piping temperature acquisition means to acquire a measured temperature of refrigerant piping connected to a heat exchanger of an indoor unit;
intake temperature acquisition means to acquire a measured temperature of an intake port of the indoor unit;
determination means to determine an operating state of the indoor unit on the basis of the measured temperature acquired by the refrigerant piping temperature acquisition means and the measured temperature acquired by the intake temperature acquisition means; and
estimation means to estimate a blowing temperature from the indoor unit on the basis of the measured temperature acquired by the refrigerant piping temperature acquisition means, the measured temperature acquired by the intake temperature acquisition means and, among estimation models of the blowing temperature of the indoor unit, an estimation model set in accordance with the operating state determined by the determination means.

Advantageous Effects of the Invention

According to the present invention, the blowing temperature from the indoor unit is estimated by considering the state of the air conditioner. As such, accuracy of the estimated value of the blowing temperature can be improved.

Additionally, even when switching the estimation model in accordance with a change in the state of the air conditioner, it is possible to prevent the estimated value of the blowing temperature from changing in an extreme manner.

Furthermore, abnormalities of the blowing temperature can be detected by analyzing the estimated blowing temperature.

Moreover, when the estimated blowing temperature deviates more than a predetermined amount from the target value, the operation of the air conditioner can be controlled so as to approach the target value.

BRIEF DESCRIPTION OF THE DRAWINGS

FIG. 6 is a block configuration diagram of an air conditioner blowing temperature estimation apparatus of a third embodiment.

DESCRIPTION OF EMBODIMENTS

Next, preferred embodiments of the present invention will be described while referencing the drawings.

First Embodiment

Figure 1:
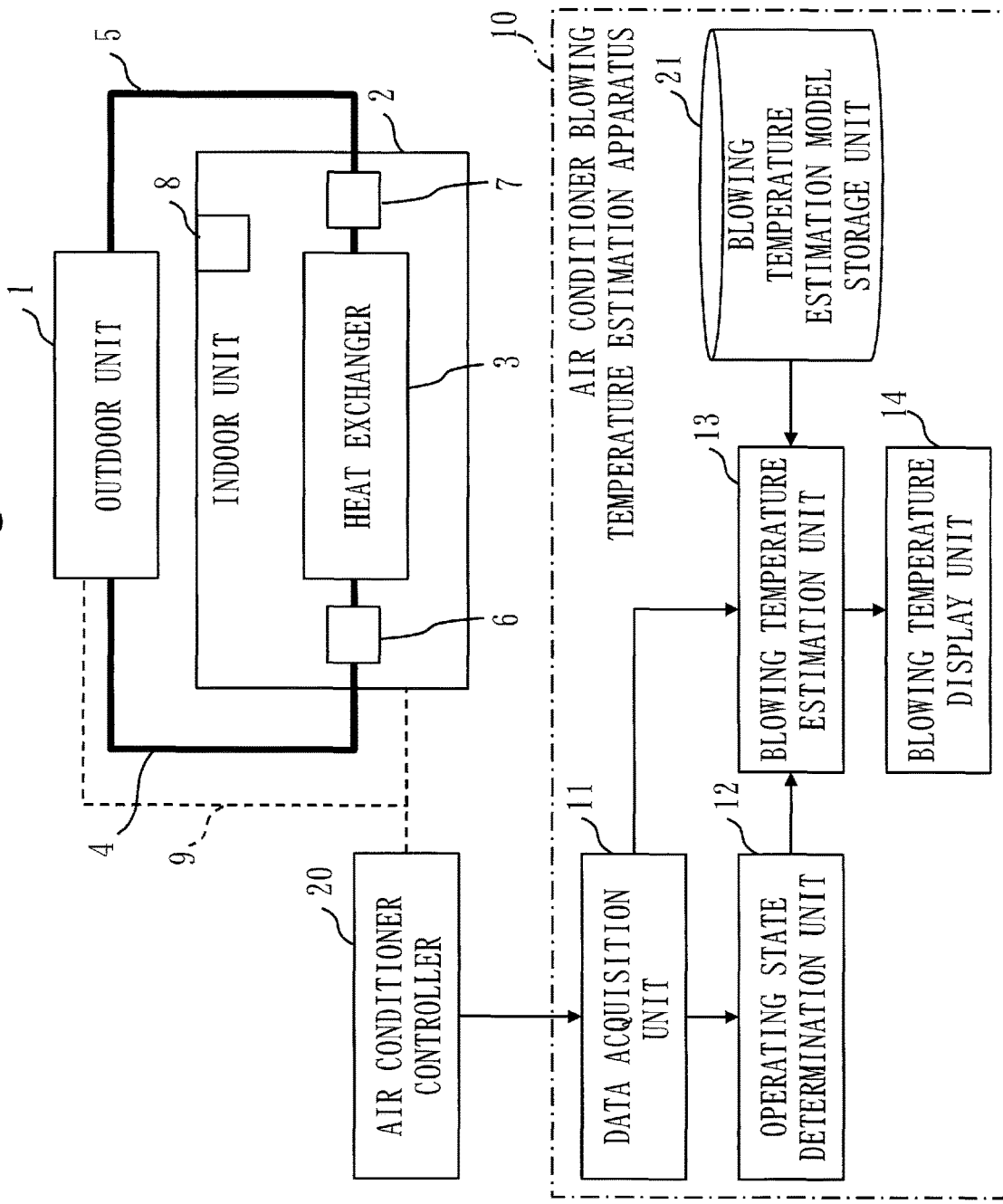
FIG. 1 is a block configuration diagram illustrating an embodiment of an air conditioner blowing temperature estimation apparatus according to the present invention.

FIG. 1 is a block configuration diagram illustrating an embodiment of an air conditioner blowing temperature estimation apparatus according to the present invention. FIG. 1 illustrates an outdoor unit 1, an indoor unit 2, a heat exchanger 3 installed in the indoor unit 2, a liquid pipe 4 and a gas pipe 5 as refrigerant piping and extending from the outdoor unit 1 to the heat exchanger 3, sensors 6, 7, and 8 to measure temperatures of the liquid pipe 4, the gas pipe 5, and an intake port (not illustrated in the drawing) of the indoor unit 2, and a signal line 9 for an air conditioner controller 20 to receive sensor data from the outdoor unit 1 and the indoor unit 2 of the air conditioner. Existing equipment may be used without modification for these components. The present embodiment is implemented by adding an air conditioner blowing temperature estimation apparatus 10 to the configuration described above.

Figure 2:
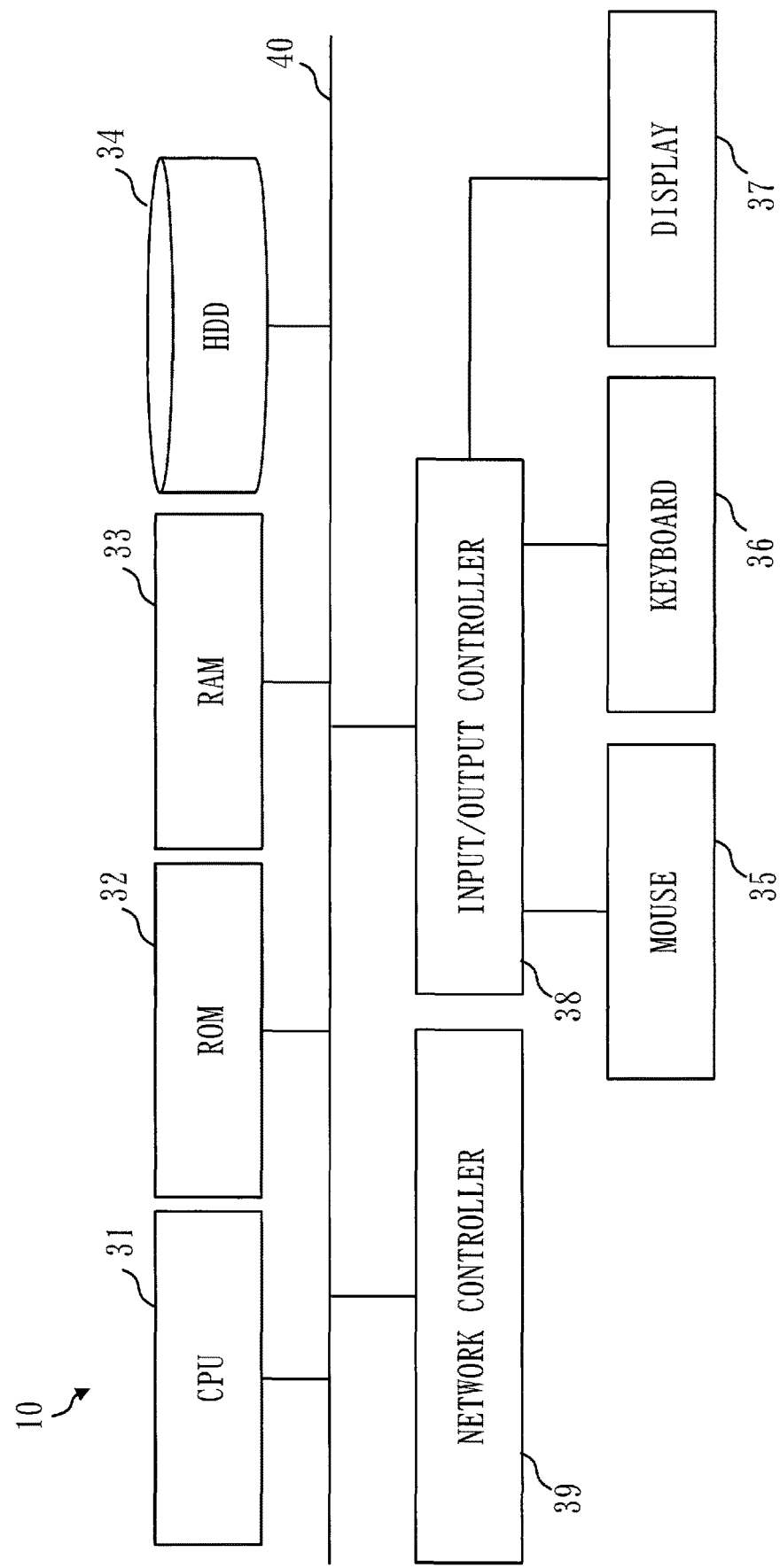
FIG. 2 is a hardware block configuration diagram of the air conditioner blowing temperature estimation apparatus of a first embodiment.

FIG. 2 is a hardware configuration diagram of a computer forming the air conditioner blowing temperature estimation apparatus 10 of the present embodiment. In the present embodiment, the computer forming the air conditioner blowing temperature estimation apparatus 10 can be realized using a general-purpose hardware configuration such as a conventionally existing personal computer (PC). That is, as illustrated in FIG. 2, the computer is configured by connecting, to an internal bus 40, a CPU 31, a ROM 32, a RAM 33, a HDD 34, an input/output controller 38 to connect each of a mouse 35 and a keyboard 36 provided as input means and a display 37 provided as a display device, and a network controller 39 provided as communication means. "CPU" is an abbreviation for "Central Processing Unit". "ROM" is an abbreviation for "Read Only Memory". "RAM" is an abbreviation for "Random Access Memory" and "HDD" is an abbreviation for "Hard Disk Drive".

The CPU 31, the ROM 32, the RAM 33, and the HDD 34 are referred to collectively as "processing circuitry".

Returning to FIG. 1, the air conditioner blowing temperature estimation apparatus 10 of the present embodiment includes a data acquisition unit 11, an operating state determination unit 12, a blowing temperature estimation unit 13, a blowing temperature display unit 14, and a blowing temperature estimation model storage unit 21. The air conditioner controller 20 periodically collects, from the air conditioner, various measured temperatures taken by the sensors 6, 7, and 8 of the liquid pipe 4, the gas pipe 5, and the intake port. The data acquisition unit 11 is provided as refrigerant piping temperature acquisition means and intake temperature acquisition means and periodically, every one minute, for example, acquires these various measured temperatures from the air conditioner controller 20 as latest measured temperatures. The operating state determination unit 12 is provided as determination means and determines an operating state of the indoor unit 2 on the basis of the various measured temperatures acquired by the data acquisition unit 11. The blowing temperature estimation unit 13 is provided as estimation means and estimates the blowing temperature from the indoor unit 2 on the basis of the various measured temperatures acquired by the data acquisition unit 11 and an estimation model of the blowing temperature from the indoor unit 2, wherein the estimation model is set in accordance with the operating state determined by the operating state determination unit 12. The blowing temperature display unit 14 displays an estimated value, obtained by estimation, of the blowing temperature from the indoor unit 2 on the display 37. The estimation model set in accordance with the operating state of the indoor unit 2 is stored in the blowing temperature estimation model storage unit 21.

The various constituents 11 to 14 of the air conditioner blowing temperature estimation apparatus 10 are realized by coordinated operations between the computer forming the air conditioner blowing temperature estimation apparatus 10 and programs executed by the CPU 31 installed in the computer. Additionally, the blowing temperature estimation model storage unit 21 is realized by the HDD 34 installed in the air conditioner blowing temperature estimation apparatus 10. Alternatively, the RAM 33 may be used as the blowing temperature estimation model storage unit 21, or external storage means may be used across a network as the blowing temperature estimation model storage unit 21.

The programs used in the present embodiment may obviously be provided by communication means or may be provided by being stored on a computer-readable recording medium such as a CD-ROM or USB memory. CD-ROMs, USB memory, and similar recordable media are non-temporary, tangible media. "CD-ROM" is an abbreviation for "Compact Disc-ROM" and "USB" is an abbreviation for "Universal Serial Bus". The programs provided from the communication means or the recording medium are installed on the computer, and the CPU 31 of the computer sequentially executes the programs to realize various types of processing.

The air conditioner and the refrigerant have a plurality of states. Specifically, an operating state in which a switch is switched from OFF to ON to perform heating operation (hereinafter referred to as "heating thermo ON"), a state in which the switch is conversely switched from ON to OFF (hereinafter referred to as "heating thermo OFF"), an operating state in which a switch is switched from OFF to ON to perform cooling operation (hereinafter referred to as "cooling thermo ON"), and a state in which the switch is conversely switched from ON to OFF (hereinafter referred to as "cooling thermo OFF"). The transition of the blowing temperature from the indoor unit 2 is thought to vary depending on the state of the air conditioner. Even when in the heating thermo ON state, the blowing temperature from the indoor unit 2 varies between when in a state in which the refrigerant piping (the liquid pipe 4 and the gas pipe 5) is not sufficiently warmed (hereinafter referred to as "transient state") and when in a state in which the transient state has passed (hereinafter referred to as "steady state"). The blowing temperature varies between the transient state and the steady state when in the cooling thermo ON state as well. The present embodiment is characterized by estimating the blowing temperature from the indoor unit 2 by considering the state of the air conditioner. The blowing temperature from the indoor unit 2 is a temperature of a blowing port of the indoor unit 2, that is, a temperature of air blown from the blowing port of the indoor unit 2.

When in heating operation, the air volume introduced from the intake port is reduced in the transient state of the heating thermo ON and the heating thermo OFF. As such, the blowing temperature is less likely to be influenced by the temperature near the intake port or the room temperature. Therefore, in the present embodiment, an estimation model is set in which the refrigerant piping temperature is used as the blowing temperature without considering the intake port temperature. Note that, in the present embodiment, the temperatures of two types of refrigerant piping, namely the liquid pipe 4 and the gas pipe 5, are measured. As such, the average value of the measured temperatures is used as the refrigerant piping temperature. When in the steady state of the heating thermo ON, an estimation model is set in which the average value of the refrigerant piping temperature and the intake port temperature is used as the blowing temperature. Thus, in the present embodiment, the estimation model is set in accordance with the operating state.

When in cooling operation, the blowing temperature is more likely to be influenced by the intake port temperature in the transient state of the cooling thermo ON and the cooling thermo OFF. This is thought to be due to the fact that warm air rises and is more likely to accumulate near the intake port. Accordingly, the estimation model is set in which the average value of the refrigerant piping temperature and the intake port temperature is used as the blowing temperature. When in the steady state of the cooling thermo ON, an estimation model is set in which an offset value (e.g. 3° C.) is added to the refrigerant piping temperature.

Figure 3:
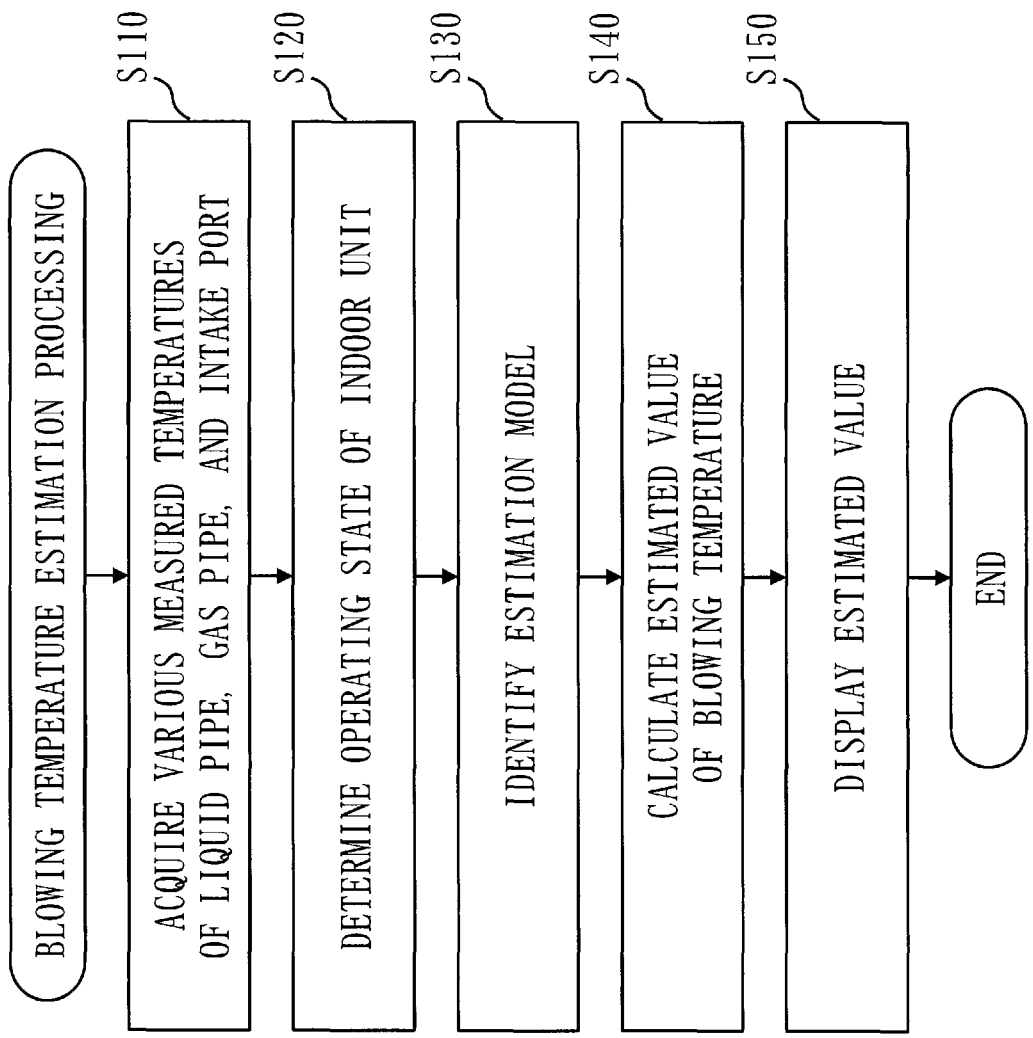
FIG. 3 is a flowchart illustrating estimation processing of a blowing temperature from an indoor unit of the first embodiment.

Next, estimation processing of the blowing temperature from the indoor unit 2 of the present embodiment will be described while referencing the flowchart illustrated in FIG. 3. As an example, a case is described for heating operation.

As described above, the data acquisition unit 11 acquires the various measured temperatures of the liquid pipe 4, the gas pipe 5, and the intake port sent periodically from the air conditioner controller 20 (step 110). An acquisition interval is not particularly limited, but when set to acquire in a long cycle such as five minutes, errors are more likely to occur, particularly in the transient state. As such, the acquisition interval was set to one minute in the present embodiment. When the data acquisition unit 11 acquires the various measured temperatures, the operating state determination unit 12 determines the operating state of the indoor unit 2 on the basis of those measured temperatures (step 120). In the present embodiment, the operating state is determined by a value obtained by subtracting the intake port temperature from the refrigerant piping temperature. Moreover, the operating state is determined from a magnitude relationship between a numerical value representing the operating state and a threshold value. That is, in the present embodiment, the operating state is determined from the magnitude relationship between the value obtained by subtracting the intake port temperature from the refrigerant piping temperature (the numerical value representing the operating state) and the threshold value.

Next, the blowing temperature estimation unit 13 identifies the estimation model set in accordance with the determined operating state (step 130), and substitutes the various measured temperatures into that estimation model to calculate the estimated value of the blowing temperature from the indoor unit 2 (step 140). When the estimated value of the blowing temperature is thusly calculated, the blowing temperature display unit 14 displays that estimated value on the display 37 (step 150). Note that, in the present embodiment, the estimated value is displayed, but the estimated value may also be sent to a computer across a network or the estimated value may be stored in predetermined storage means.

Figure 4:
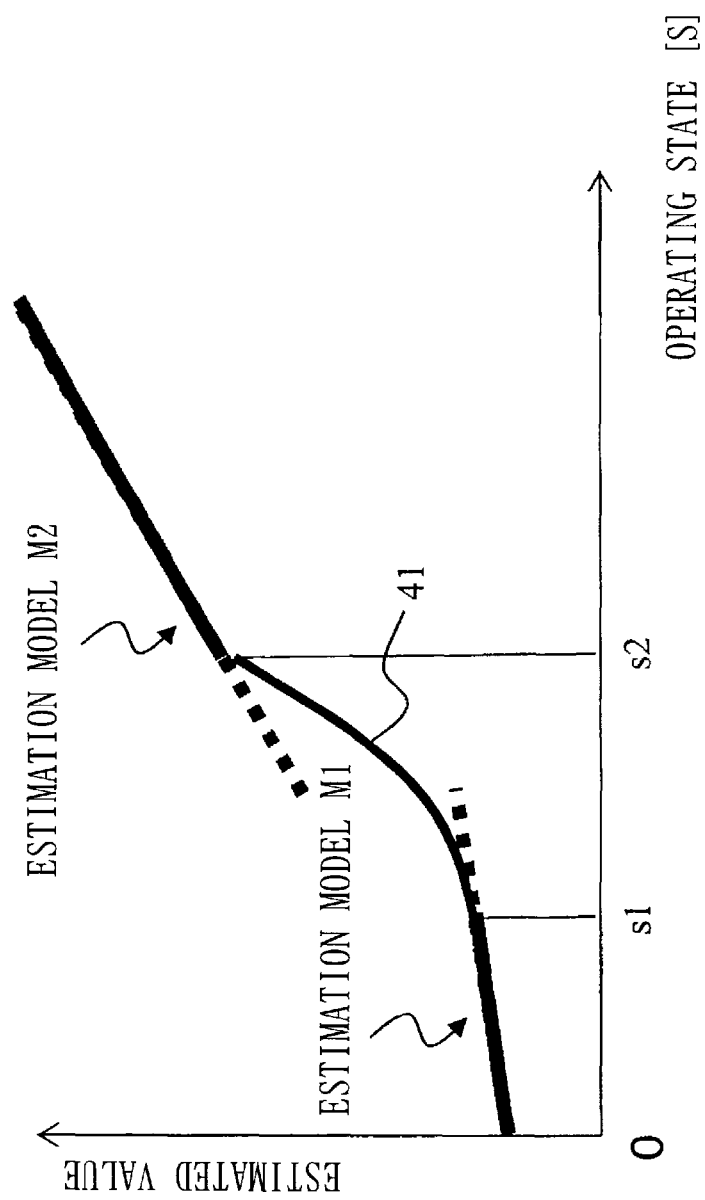
FIG. 4 is a drawing illustrating, as a graph, estimation models set for each operating state of the first embodiment.

FIG. 4 is a drawing illustrating, as a graph, the estimation model set for each of the operating states. According to the example illustrated in FIG. 4, when a numerical value S representing the operating state is less than a threshold value s1, estimation model M1 is selected and, when the numerical value S representing the operating state is greater than or equal to a threshold value s2, estimation model M2 is selected. Note that, when in the heating operation, the estimation model M1 corresponds to the estimation model corresponding to the transient state of the heating thermo ON, and the estimation model M2 corresponds to the estimation model corresponding to the steady state of the heating thermo ON. Although s1 and s2 may be identical values, in this case, s1<s2, as illustrated in FIG. 4. As illustrated in FIG. 4, when the estimation models M1 and M2 do not intersect between s1 and s2, there is a possibility that the estimated value will greatly change when switching between estimation models. As such, in the present embodiment, estimated values between s1 and s2 are adjusted so as to change continuously and smoothly without becoming discontinuous. In order to achieve this, the estimated value is calculated by weighting the estimation models M1 and M2.

In one example, a weighting t is calculated using the equation t=(s2−S)/2. Then, the estimated value between s1 and s2 is calculated using the following equation:

Estimated value=estimated value based on estimation model $M1 \times t$+estimated value based on estimation model $M2 \times (1-t)$ In this case, the estimated value changes continuously and smoothly as illustrated by a line 41 in FIG. 4.

According to the present embodiment, as described above, the estimation model is set in accordance with the operating state of the indoor unit 2, and the estimation model, corresponding to the state of the air conditioner determined on the basis of the various measured temperatures of the liquid pipe 4, the gas pipe 5, and the intake port, is selected. The blowing temperature from the indoor unit 2 is estimated using the selected estimation model and, as such, the accuracy of the estimated value of the blowing temperature can be improved.

Note that, in the present embodiment, the average value of the various measured temperatures of the liquid pipe 4 and the gas pipe 5 is used as the refrigerant piping temperature to accurately estimate the blowing temperature, but configurations are possible in which only one of the measured temperatures is used.

Second Embodiment

Figure 5:
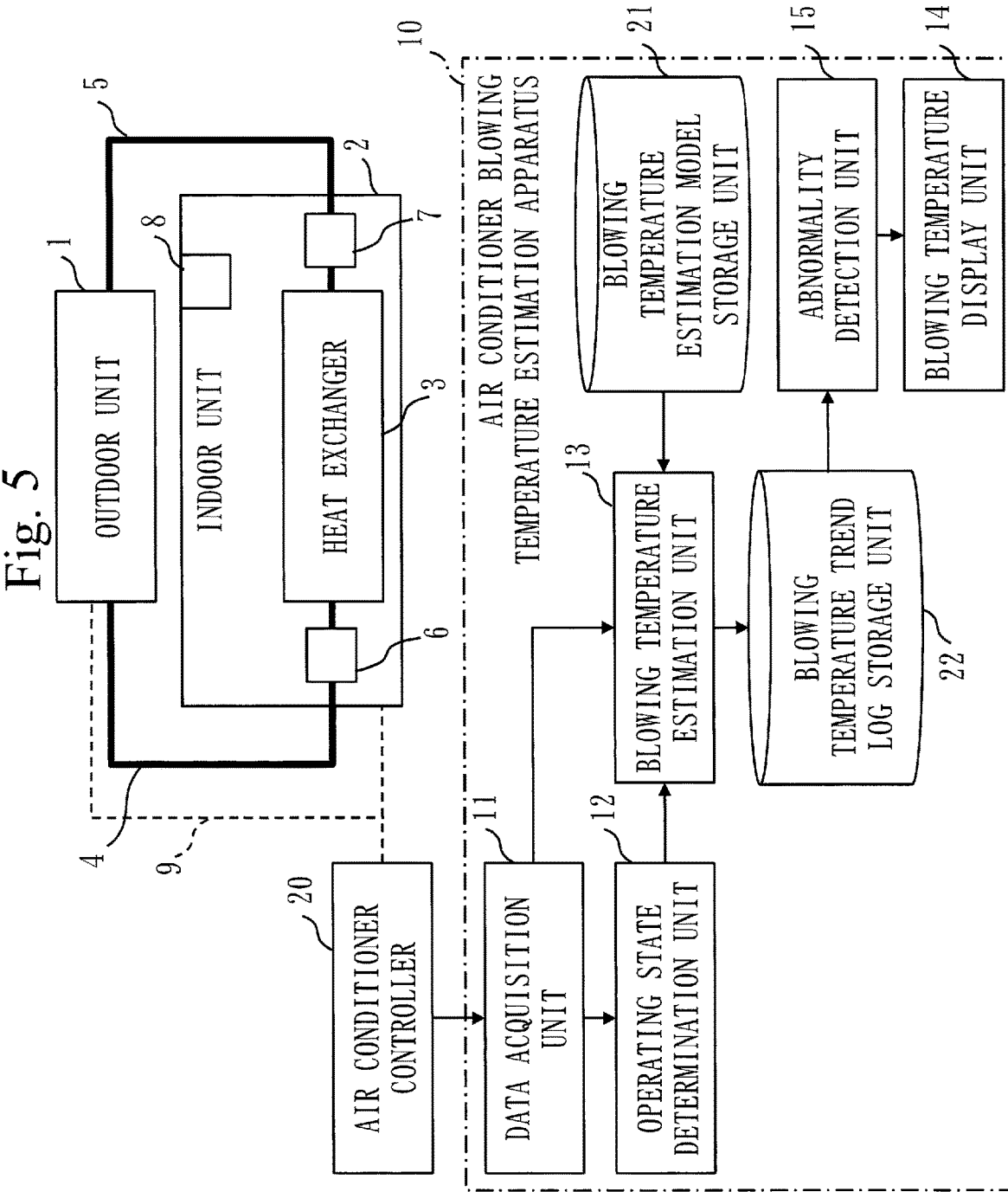
FIG. 5 is a block configuration diagram of an air conditioner blowing temperature estimation apparatus of a second embodiment.

FIG. 5 is a block configuration diagram of an air conditioner blowing temperature estimation apparatus of the present embodiment. Note that constituents identical to constituents described in the first embodiment are marked with the same reference signs and descriptions thereof are appropriately forgone. In addition, the hardware configuration may be identical to that of the first embodiment.

The air conditioner blowing temperature estimation apparatus 10 in the present embodiment includes an abnormality detection unit 15 and a blowing temperature trend log storage unit 22 in addition to the components described in the first embodiment. The abnormality detection unit 15 is realized by coordinated operations between the computer and programs executed by the CPU 31 installed in the computer, and the blowing temperature trend log storage unit 22 is realized by the HDD 34. In the first embodiment, the estimated value of the blowing temperature is simply displayed but, in the present embodiment, a blowing temperature trend log, which is chronological data of the estimated values of the blowing temperature, is accumulated so that the transition of the estimated value of the blowing temperature will be understood.

Moreover, the abnormality detection unit 15 detects abnormalities in the blowing temperature from the indoor unit 2 by chronologically analyzing the estimated values of the blowing temperature accumulated in the blowing temperature trend log storage unit 22. In one example, an abnormality is determined when an amount of change obtained from an estimated value of the blowing temperature obtained on the basis of a measured temperature acquired immediately before, and an estimated value of the blowing temperature obtained on the basis of a measured temperature presently acquired exceeds a threshold value.

When the abnormality detection unit 15 detects an abnormality in this manner, the blowing temperature display unit 14, as notification means, notifies a maintenance worker of the occurrence of the abnormality by displaying a message indicating that an abnormality was detected, together with the estimated value of the blowing temperature.

Third Embodiment

FIG. 6 is a block configuration diagram of an air conditioner blowing temperature estimation apparatus of the present embodiment. Note that constituents identical to constituents described in the first embodiment are marked with the same reference signs and descriptions thereof are appropriately forgone. Additionally, the hardware configuration may be identical to that of the first embodiment.

The air conditioner blowing temperature estimation apparatus 10 in the present embodiment includes a control command unit 16 and a blowing temperature setting information storage unit 23 in addition to the components described in the first embodiment. The control command unit 16 is realized by coordinated operations between the computer and programs executed by the CPU 31 installed in the computer, and the blowing temperature setting information storage unit 23 is realized by the HDD 34. In the first embodiment, the processing ends with the simple displaying of the estimated value of the blowing temperature, but in the present embodiment, processing is performed that extends to operation control of the indoor unit 2.

A target value of the blowing temperature from the indoor unit 2 is preset as blowing temperature information in the blowing temperature setting information storage unit 23. Note that, the target value set in the blowing temperature setting information storage unit 23 may be a single target value or may be set for each operating state. When the estimated value of the blowing temperature by the blowing temperature estimation unit 13 deviates from the target value of the blowing temperature, the control command unit 16, as command means, commands the air conditioner controller 20, as operation control means of the indoor unit 2 so that the estimated value of the blowing temperature by the blowing temperature estimation unit 13 approaches the target value. The air conditioner controller 20 that has received the command controls the operations of the indoor unit 2 so that the estimated value of the blowing temperature approaches the target value.

Supplementary explanation is given below.

The estimation of the blowing temperature is performed periodically. In one example, the estimation of the blowing temperature is performed on a 30-second cycle. Changes in the operating state of the air conditioner are considered each cycle. Therefore, even if a blowing temperature sensor is not provided, feedback control of the blowing temperature using the estimated value is possible. As such, provided that the control is performed correctly, the indoor unit 2 will operate so as to reduce the deviation between the estimated value and the target value of the blowing temperature. Typical feedback control is anticipated as the control by the air conditioner controller 20 on the operations of the indoor unit 2. As output, the refrigerant piping temperature is controlled. A target value of the refrigerant piping temperature can be calculated as follows. When a target temperature and a room temperature are given in the estimation model, candidates for the target refrigerant piping temperature can be reverse-calculated. Since there are a plurality of unknowns, a solution cannot be uniquely determined, but a solution can be selected by applying a control condition of minimizing energy efficiency on the basis of a state of a refrigeration circuit. The air conditioner controller 20 controls an expansion valve of the indoor unit, a compressor of the outdoor unit, or the like so that the refrigerant piping temperature approaches the selected temperature.

Cases in which the estimated value deviates from the target value are cases where the difference between the estimated value and the target value is greater than or equal to a predetermined threshold value.

According to the present embodiment, it is possible to support the operation control of the indoor unit 2 as described above.

Note that the configurations described above in the first to third embodiments may be appropriately combined and used. Additionally, in the present embodiments, an example is described in which the air conditioner blowing temperature estimation apparatus 10 is a PC, but is not limited thereto and, for example, a configuration is possible in which the processing functions of the air conditioner blowing temperature estimation apparatus 10 are incorporated into the air conditioner controller 20.

REFERENCE SIGNS LIST

1: outdoor unit, 2: indoor unit, 3: heat exchanger, 4: liquid pipe, 5: gas pipe, 6, 7, 8: sensor, 9: signal line, 10: air conditioner blowing temperature estimation apparatus, 11:

data acquisition unit, 12: operating state determination unit, 13: blowing temperature estimation unit, 14: blowing temperature display unit, 15: abnormality detection unit, 16: control command unit, 20: air conditioner controller, 21: blowing temperature estimation model storage unit, 22: blowing temperature trend log storage unit, 23: blowing temperature setting information storage unit, 31: CPU, 32: ROM, 33: RAM, 34: HDD, 35: mouse, 36: keyboard, 37: display, 38: input/output controller, 39: network controller, 40: internal bus.

The invention claimed is:

1. An air conditioner blowing temperature estimation apparatus comprising:
   processing circuitry
   to acquire a measured temperature of refrigerant piping connected to a heat exchanger of an indoor unit,
   to acquire a measured temperature of an intake port of the indoor unit,
   to determine an operating state of the indoor unit on the basis of the acquired measured temperature and the acquired measured temperature, and
   to estimate a value of a temperature of air blowing from the indoor unit on the basis of the acquired measured temperature of refrigerant piping, the acquired measured temperature of the intake port and, among estimation models of the temperature of the air blowing from the indoor unit, an estimation model set in accordance with the determined operating state,
   wherein the processing circuitry adjusts an estimated value of the temperature of the air blowing from the indoor unit so that the estimated value continuously changes when switching the estimation model as a result of transitioning from a present operating state of the indoor unit to a different operating state.

2. The air conditioner blowing temperature estimation apparatus according to claim 1, wherein the processing circuitry
   detects an abnormality of the temperature of the air blowing from the indoor unit by analyzing a chronological change in an estimation temperature, and
   notifies that an abnormality has been detected.

3. The air conditioner blowing temperature estimation apparatus according to claim 1, wherein the processing circuitry commands controller of the indoor unit so that, when the estimated temperature deviates from a target value of the temperature of the air blowing from the indoor unit, the estimation temperature approaches the target value.

4. The air conditioner blowing temperature estimation apparatus according to claim 1, wherein each of the estimation models is graphically represented as a different line or curve correlating a numerical value representing the operating state of the indoor unit to a numerical value of the temperature of the air blowing from the indoor unit.

5. A non-transitory computer-readable recording medium storing a program which, when executed, causes a computer to:
   acquire a measured temperature of refrigerant piping connected to a heat exchanger of an indoor unit;
   acquire a measured temperature of an intake port of the indoor unit;
   determine an operating state of the indoor unit on the basis of the acquired measured temperature of the refrigerant piping and the acquired measured temperature of the intake port of the indoor unit; and
   estimate a value of a temperature of air blowing from the indoor unit on the basis of the acquired measured temperature of the refrigerant piping, the acquired measured temperature of the intake port of the indoor unit, and, among estimation models of the temperature of the air blowing from the indoor unit, an estimation model set in accordance with the determined operating state,
   wherein an estimated value of the temperature of the air blowing from the indoor unit is adjusted so that the estimated value continuously changes when switching the estimation model as a result of transitioning from a present operating state of the indoor unit to a different operating state.

6. The non-transitory computer-readable recording medium according to claim 5, wherein each of the estimation models is graphically represented as a different line or curve correlating a numerical value representing the operating state of the indoor unit to a numerical value of the temperature of the air blowing from the indoor unit.

* * * * *